United States Patent [19]

Houvouras

[11] 3,872,736

[45] Mar. 25, 1975

[54] CYCLE TRANSMISSION

[76] Inventor: Michael P. Houvouras, 5351 W. Giddings, Chicago, Ill. 60630

[22] Filed: Mar. 16, 1973

[21] Appl. No.: 341,948

[52] U.S. Cl. ................................... 74/337, 74/416
[51] Int. Cl. ............................................. F16h 5/52
[58] Field of Search ........... 74/337, 416, 351, 190.5

[56] References Cited
UNITED STATES PATENTS

| | | | |
|---|---|---|---|
| 715,404 | 12/1902 | Markgraf | 74/351 |
| 955,279 | 4/1910 | Moore, Sr. | 74/351 |
| 1,045,215 | 11/1912 | Teeter | 74/337 X |
| 1,139,433 | 5/1915 | Monro | 74/337 X |
| 1,853,866 | 4/1932 | Kirby | 74/190.5 |
| 2,343,507 | 3/1944 | Hoffar | 74/459 |
| R23,728 | 10/1953 | Teigman | 74/337 X |

*Primary Examiner*—Samuel Scott
*Assistant Examiner*—John Reep

[57] ABSTRACT

A transmission for a cycle having at least two wheels and a frame and including pedal means for receiving input power and a variable gear assembly connected to one of said wheels for transmitting rotational power thereto. A manual selector means permits the cyclist to preselect the desired torque and speed ratios of the gear assembly which he desires. Interconnected between the gear assembly and pedal means is a power drive assembly comprising a torque sensing unit which includes a telescopic rotational drive shaft having at least two members threadedly engaged to one another and capable of limited telescopic movement in response to changes in pedal effort required to propel the cycle. The power transfer connection with the gear assembly automatically varies torque and speed ratios in proportion to telescopic movement of the shafts so as to maintain the pedal effort substantially constant with the pre-selected torque ratio regardless of changes in the slope of the terrain over which the cycle is pedaled.

3 Claims, 4 Drawing Figures

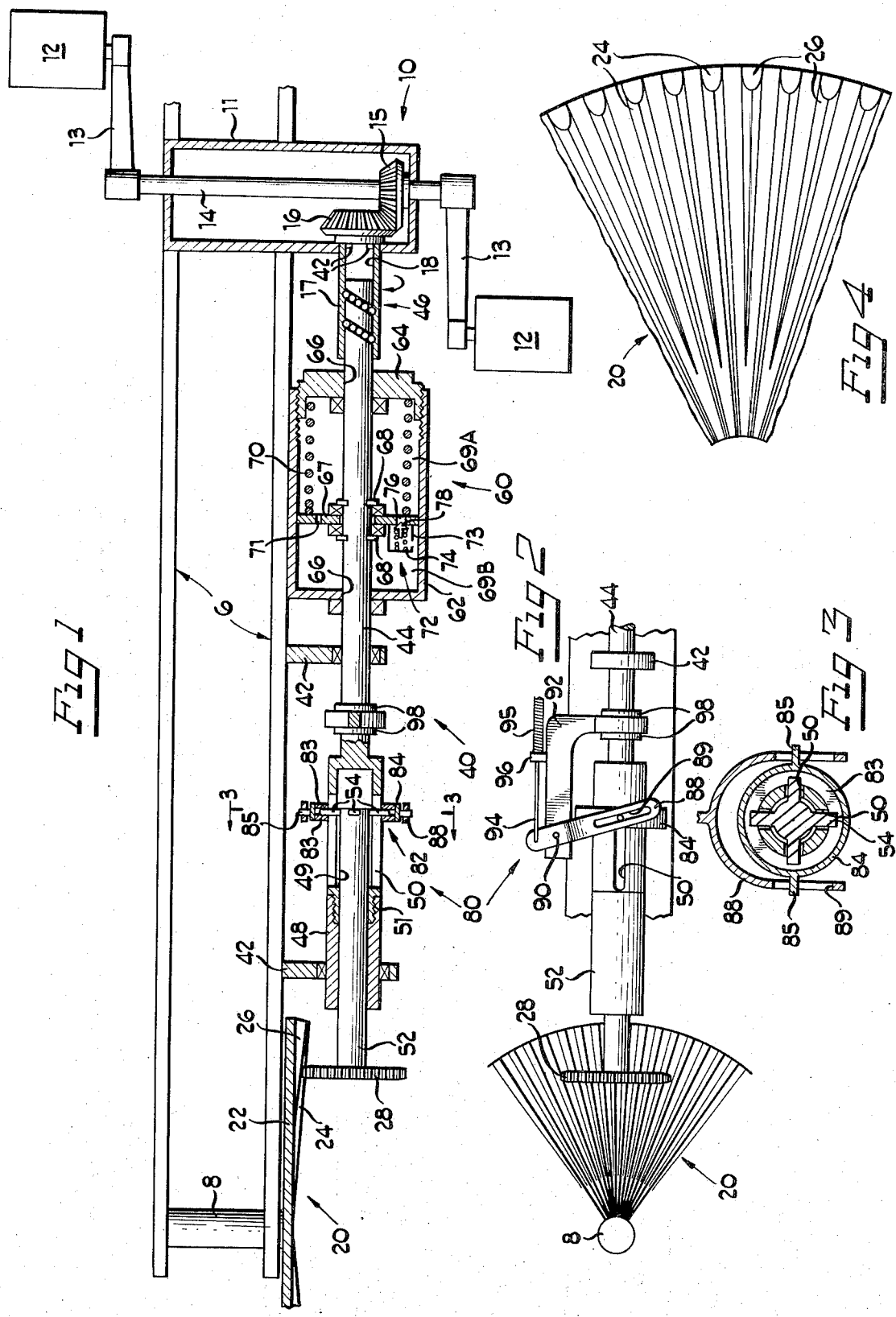

CYCLE TRANSMISSION

BACKGROUND OF THE INVENTION

This invention relates to a power transmission system. Preferably, it relates to a power transmission mechanism for a pedal driven cycle in which the torque output requirement can be preset according to the cyclist's preference and will remain substantially constant, regardless of minor changes in the slope of the terrain.

Currently available cycles have chain drives with change speed gearing which permits the cyclist to manually select the ratio between the rotational pedal speed and the speed of the drive wheel. In these cycles, such is accomplished by substituting sprockets of different size into the power transmission system. Obviously, such effects changes in both the torque and speed ratios between the pedal sprocket and the drive wheel sprocket. Once the sprocket size for the chain drive is selected, the torque input requirement is dependent upon the slope of the terrain.

A desirable cycle transmission would eliminate the chain drive assembly due to its cost, maintenance and the mechanical problems of shifting the drive chain from sprocket to sprocket to effect changes in speed and torque ratios. Too, many cyclists would prefer a transmission assembly in which torque input can be initially pre-selected and subsequently remain substantially constant at this pre-selected level, even though the slope of the terrain changes.

SUMMARY OF THE INVENTION

In order to obtain these and other desirable features, the instant invention includes a cycle transmission having a power drive assembly interconnected between the pedals and a variable gear assembly constrained for rotation with a driven wheel. Manual selector means are provided to enable the cyclist to select a desirable optimum pedal effort and torque output ratio of the variable gear assembly. Additionally, the power drive assembly includes a torque sensing unit which senses changes in the pedal effort requirements as effected by changes in the terrain and automatically varies the gear ratio to maintain the pedal effort more constant.

Accordingly, it is a primary object of my invention to provide a cycle transmission which eliminates the present chain drive assembly and still provides for a manually selectable torque output and speed ratio between the pedals and the driven wheel. Another object of my invention is to provide a cycle transmission which automatically varies the torque output ratio so as to maintain the pedal effort required to propel this cycle substantially constant even though the slope of the terrain changes. Too, it is an object of my invention to provide a unique torque sensing apparatus for a rotational power drive assembly which measures changes in torque input and automatically varies the gear assembly so as to maintain the torque input requirement more constant. Finally, it is an object of my invention to provide a cycle transmission which is relatively inexpensive, easy to maintain, and which presents minimum operational problems.

DESCRIPTION OF THE DRAWINGS

The manner in which these and other objects of my invention are obtained can be better understood with reference to the following specifications and drawings in which:

FIG. 1 is a plan view taken in section through a horizontal center line of a preferred embodiment of my invention;

FIG. 2 is a side elevational view of a portion of the preferred embodiment of FIG. 1;

FIG. 3 is a side elevational view taken in section along the lines 3—3 of FIG. 1; and FIG. 4 is a side elevational view of a portion of the drive gear assembly illustrated in FIGS. 1 and 2.

DETAILED DESCRIPTION

As shown in FIG. 1, the preferred embodiment of the transmission assembly is carried by a support frame 6 of a cycle and comprises three primary components including a power input means 10 in the form of a pedal assembly, a power output section or variable gear assembly 20, and a power transfer assembly 40 which receives input power from the assembly 10 and transmits same to the variable gear assembly 20 in a manner hereinafter explained. The power transfer means includes a first section 60 which senses changes of the pedal effort required to pedal the cycle over terrain having varying slope, and alters the gear ratio of the variable gear assembly to maintain the pedal effort of the cyclist more constant. A second section 80 relates to a manual selection device through which the cyclist can preselect the pedal effort and speed ratio at which he desires to pedal the bicycle, such being subject to the automatic over-ride effected by the torque sensing mechanism or first section 60. Subsequent discussion of each of these sub-assemblies will bring out their interrelationship and functioning in more detail.

With reference to the power input means 10, such comprises a housing 11 which is secured to the frame 6 as by welding or other convenient means. This housing rotatably journals a cross-shaft 14 through anti-friction means (not shown). Constrained for rotation with the cross-shaft 14 are crank arms 13 to which the pedals 12 are attached, such crank arms and pedals being of conventional cycle manufacture. Rotational power delivered to the pedals by the cyclist is then transferred through the cross-shaft 14 to a drive pinion 15 in mesh with a second pinion 16 which is also journaled in the housing 11 and has extending therefrom a stub shaft 17 with a counter bore 18. Pinions 15 and 16 may have any desired speed ratio.

The input power directed to the pedals 12 is thus transferred to the power drive or power transfer means 40 (which will be subsequently explained), and is then directed to a variable gear assembly 20. This assembly includes an annular plate 22 which is constrained for rotation with an axle 8 journaled within the frame of the cycle 6 by appropriate anti-friction means (not shown). As more clearly illustrated in FIGS. 2 and 4, this annular plate has an exposed surface carrying, preferably, at least two sets of radially extending gear teeth 24 and 26. The first set of gear teeth 24 extend from a point adjacent the center of the plate to its circumference, while the second set of teeth extend from the circumference of the plate radially inward for approximately one-half its radius. In one embodiment, it is contemplated that the number of teeth of both sets 24 and 26 be 36 in number. Thus, on the exterior circumference of the annular plate 22, there will be a total of 72 teeth, while adjacent the axle, there will be only 36 teeth per revolution of the annular plate 20.

Driving this annular plate 22 and the axle 8 constrained for rotation therewith is a pinion gear 28 which is connected to the power drive assembly 40. As subsequently described, the pinion 28 is capable of movement in a radial direction along the gear teeth of plate 22 such that the torque ratio between pinion 28 and the axle 8 will vary according to the radial distance of the pinion from the axle. Too, since there are two sets of gears on the surface of the plate, the speed ratio between the pinion 28 and the plate 22 will vary depending upon the radial position of the pinion 28. Such changes in the torque and speed ratios are effected through sub-assemblies of the power transmission assembly 40 hereinafter described.

The assembly 40 is utilized to transfer rotational power from the pedals 12 to the gear assembly 20 and the axle 8, by effecting rotation of the pinion 28. Such is accomplished by a rotational driving connection between the stub shaft 17, a telescopic shaft 44 and a third shaft 52 which is constrained for rotation with the pinion 28, the entire power transfer means 40 being supported in a longitudinal position relative to the frame 6 by support arms 42, which may include antifriction bearings (not shown).

One subassembly of the power transmission unit 40 for varying the torque output ratio is the torque sensing mechanism 60. This torque sensing device 60 has a primary purpose of measuring the power exerted on the pedals 12, and should there by any change in power requirements to pedal the cycle, it shifts the pinion 28 along a horizontal radius of the plate 22 to effect an increase or decrease in the torque ratio of the gear assembly. Such is effected by longitudinal movement of the telescopic rod 44, the extent of telescopic movement being measured by and in proportion to the increase in torque input. To accomplish this proportional telescopic movement, a ball bearing screw type interconnection 46 between the stub shaft 17 and the telescopic shaft 44 is utilized. Thus, as the bicycle is pedaled in a forward direction, the stub shaft 17 will rotate in the direction of the arrow as indicated. Such rotational movement is imparted to the telescopic shaft 44 due to the rotational force of the balls acting at an angle to the threads between the members 44 and 17. However, the pitch of the threads within the ball bearing screw 46 is such that a longitudinal force along the axis of the member 44 is also effective to draw the member 44 forwardly against the housing 11, the forward movement being limited by abutments 42. Additionally, the torque sensing member 60 includes a resilient bias which opposes such telescopic movement in proportion to any change in torque input applied to the pedals 12. This biasing means includes a housing 62 attached to frame 6 having apertures 66 at each end thereof through which the shaft 44 passes. The apertures 66 may journal the shaft 44 through oil sealed bearings as indicated. For purposes hereinafter described, one end of the housing 62 comprises a threaded end member 64 which threadedly engages the interior circumference of the housing 62. Carried by the shaft 44 within this housing is a reaction plate 67 which is held in a fixed position on the shaft 44 by snap rings 68. Between the snap rings 68 and the reaction plate 67 are oil sealed bearings as indicated which act to reduce any friction between the reaction plate and the shaft and also effect a division of the housing 62 into two chambers 69A and 69B. Accordingly, if an increase in torque input to the pedals 12 is effected, the rotational power of stub shaft 17 attempts to draw the shaft 44 longitudinally towards the housing 11, such forward movement being resisted by a spring or other resilient means 70 which acts against reaction plate 67. The spring 70 measures the change in torque applied and permits reciprocal movement of the shaft 44 in proportion to such change in torque. Thus, as the shaft 44 is moved forwardly, the pinion 28 is also moved forwardly to a larger diameter of the plate 22 to increase the lever arm from the center of the plate to the pinion, thus increasing the torque output ratio between the gear assembly 20.

Inasmuch as pedal effort by cyclists varies during each revolution, and since small changes in the torque output ratio between pinion 28 and plate 22 is undesirable, the chambers 69A and 69B are filled with a fluid while valve means in the reaction plate 67 are used to dampen or limit such changes.

Such is accomplished by the use of a one-way valve 72 in the reaction plate which sealingly separates the oil chambers 69A and 69B. This one-way valve may include a housing 73 having apertures as shown permitting communication between the interior of housing and the chamber 69B. Additionally, within the housing 73 is a valve member 78 which seats against a large orifice 76 under the bias of a spring 74 having a low spring rate. Thus, an increase in torque by the pedals 12 will urge the shaft 44 and the reaction plate 67 forwardly and fluid can easily flow from chamber 69A into chamber 69B to effect an increase in the torque ratio between the plate 22 and the pinion 28 by moving the latter forward. However, to provide a steady state condition, and to preclude rapid movement of the pinion 28 backwards and forwards along the radius of the plate 22, an orifice 71 will permit restricted fluid flow from chamber 69B into chamber 69A. This orifice is of small size so as to limit fluid flow in a very gradual manner, and to maintain the pinion 28 in a relatively fixed position on the plate 22. To insure undesired fluid flow between the chambers, the plate 67 may carry a circumferential seal (not shown).

Movement of the pinion gear 28 along the radius of the plate 22 to effect changes in speed and torque ratios is also effected by manual pre-selection means or control lever 80. Referring again to FIG. 1, it will be seen that the first telescopic shaft 44 terminates in an enlarged diameter 48 having a counterbore 49. This enlarged diameter is also provided with four longitudinal slots 50 spaced at 90° apart. Reciprocable within the enlarged diameter portion 48 of the shaft 44 is a second telescopic shaft 52 which carries pinion 28 of gear assembly 20. As shown in FIGS. 2 and 3, the forward end of this telescopic shaft 52 has four prongs or ears 54 which are adapted to slide in the slots 50, these ears 54 transmitting rotational motion of the shaft 44 to the shaft 52. For purposes of assembly, the enlarged diameter 48 of the shaft 44 may be made in two parts and threaded together as at 51 whereby the prongs 54 may be inserted into the slots 50. Thus, it should be apparent that the telescopic rod 52 can reciprocate within the enlarged diameter 48 of the shaft 44 to move pinion 28 along a horizontal radius of the plate 22 to vary torque and speed output.

This telescopic movement of the rod 52 is effected by the manual control lever means 80. Mounted on each side of the four ears 54 which extend outwardly of the enlarged diameter 48 of the shaft 44 is a shift ring 82 which effects reciprocation of the shaft 52. This shift ring 82 may take the form of washers 83 adjacent each side of the four prongs so as to permit rotational motion of the prongs while a bridge 84 joining the washers 83 carries outwardly extending pins 85. A bifurcated lever 88 having slots 89 engages the pins 85 and is pivotally mounted at 90 upon a bracket 92. This bracket 92 is of an L-shaped form and extends forwardly and downwardly on shaft 44 with its lower end circumscribing the shaft so as to permit relative rotation thereof without movement of the lever 92. Thus, a bearing (not shown) may separate the lever 92 from the shaft, while a support (not shown) permitting longitudinal movement of the bracket 92 may extend from the support frame 6 to hold the bracket 92 in an upright position as shown in FIG. 2. Means for pivoting the bifurcated fork lever 88 and the shift ring 82 includes a wire or cable 94 which may extend to the handle bars of the cycle through a coaxial cable 95, the latter being fixedly attached to the bracket 92 at 96. Thus, it should be obvious that as the cable 94 is moved, the fork 88 is pivoted about the pin 90 to shift pinion 28 and its associated shaft 52 along a horizontal radius of the gear plate 22 to effect changes in speed and torque ratios. Snap rings 98 on either side of the bracket 92 may be used to preclude relative longitudinal movement between this bracket and the telescopic shaft 44.

Thus it should be apparent that the manual control means 80 will initially establish a position of the pinion 28 relative to the gear plate 22 thus permitting the cyclist to preselect the desired torque and speed ratios he desires during normal pedaling conditions. The torque sensing unit is effective to maintain these ratios since it measures changes in torque input and shifts pinion 28 automatically to maintain pedal effort more constant. However, it should be noted that telescopic movement of the rod 44 in response to an increase or decrease of torque input on the pedals 12 will not effect the relative positioning of the shafts 52 and 44 for the reason that the bracket 92 is arranged on the shaft 44 in a parallelogram linkage. Thus movement of the bracket 92 along with the shaft 44 will hold the shift ring 82 and shaft 52 in a fixed position relative to the enlarged diameter 48 of shaft 44.

Accordingly, this specification discloses a power drive unit for a cycle in which the torque and speed ratios may be initially preselected by the cyclist by selection means 80. Too, a torque sensing means is effective to override this preselected setting to increase the torque ratios of the gear assembly in response to an increase in pedal pressure so as to maintain the required pedal efforts substantially constant. Obviously various modifications and improvements of my invention may be incorporated into this disclosure. For example, the end plate 64 is threadedly attached to the torque sensing housing 62 whereby further threaded engagement thereof will increase the bias of spring 70 and hence the operator can manually establish the sensitivity of the sensing unit.

I claim:

1. A transmission for a cycle having a support frame and at least two wheels carrying said support frame, said transmission comprising:
    a. power input means attached to said support frame for receiving power input;
    b. gear means connected to one of said wheels and having a variable speed ratio;
    c. a power drive means interconnected between said power input means and said gear means for transmitting rotational power therebetween, said power drive means including a movable interconnection with said gear means for varying the speed ratio thereof;
    d. resilient sensing means in said power drive means for sensing the power input thereto, and for automatically shifting said movable interconnection to vary the speed ratio of said gear means inversely with the power input; and
    e. said resilient sensing means includes a dashpot for minimizing minute variations in telescopic movement of said shafts.

2. A transmission as recited in claim 1 in which said power drive means includes manual control means for initially preselecting the desired torque output ratio and speed ratio of said gear means.

3. A transmission for a cycle having at least two wheels, a supporting frame and means for receiving power input, said transmission comprising:
    a. variable gear assembly connected to one of said wheels and having variable speed ratios; and
    b. transmission means drivingly interconnected between said means for receiving power input and said variable gear assembly and including torque sensing means for sensing a change in the torque input and for varying the torque output of said gear assembly in response thereto; and
    c. said torque sensing means includes a dashpot to minimize variations in torque input.

* * * * *